US008247119B2

(12) United States Patent
Nishiyama et al.

(10) Patent No.: US 8,247,119 B2
(45) Date of Patent: Aug. 21, 2012

(54) FUEL CELL SYSTEM

(75) Inventors: Tadashi Nishiyama, Sakura (JP); Yoshihito Kimura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 321 days.

(21) Appl. No.: 12/048,718

(22) Filed: Mar. 14, 2008

(65) Prior Publication Data
US 2008/0226964 A1 Sep. 18, 2008

(30) Foreign Application Priority Data

Mar. 14, 2007 (JP) ................................. 2007-065179

(51) Int. Cl.
*H01M 8/06* (2006.01)
(52) U.S. Cl. ........ 429/413; 429/454; 429/455; 429/458; 429/459; 429/460; 429/512; 429/513
(58) Field of Classification Search .................... 429/34, 429/38; 285/363
See application file for complete search history.

(56) References Cited

U.S. PATENT DOCUMENTS

| 6,541,148 | B1 | 4/2003 | Walsh et al. | |
|---|---|---|---|---|
| 7,063,912 | B2 | 6/2006 | Vuk et al. | |
| 2003/0122377 | A1* | 7/2003 | Northrop et al. | 285/363 |
| 2005/0106446 | A1* | 5/2005 | Sato et al. | 429/38 |
| 2005/0134045 | A1 | 6/2005 | Mohan et al. | |
| 2006/0147774 | A1* | 7/2006 | Suzuki et al. | 429/26 |
| 2007/0065696 | A1* | 3/2007 | Fukuma et al. | 429/26 |
| 2008/0100059 | A1* | 5/2008 | Holzheu | 285/146.1 |

FOREIGN PATENT DOCUMENTS

| CN | 1323073 | | 11/2001 |
|---|---|---|---|
| DE | 10153372 | A1 | 5/2002 |
| DE | 10235859 | A1 | 2/2004 |
| DE | 102004008983 | A1 | 9/2005 |
| EP | 0575178 | A1 | 12/1993 |
| EP | 1582798 | A1 | 10/2005 |
| GB | 971721 | | 10/1964 |
| JP | 09007627 | A * | 1/1997 |

(Continued)

OTHER PUBLICATIONS

Babir, F., "System design for stationary power generation," *Handbook of Fuel Cells—Fundamentals, Technology and Applications*, Wolf Vielstich, et al. (eds.), John Wiley & Sons, Ltd., vol. 4, Chpt. 51, pp. 684-692 (2003).

(Continued)

*Primary Examiner* — Jennifer Michener
*Assistant Examiner* — Heng Chan
(74) *Attorney, Agent, or Firm* — Nelson Mullins Riley & Scarborough LLP; Anthony A. Laurentano

(57) ABSTRACT

In a fuel cell system, a humidifier is attached to an end plate. A pipe connector of a fluid pipe provided at the end plate such as an oxygen-containing gas inlet manifold and a pipe connector of a fluid pipe of the humidifier such as a humidified air supply pipe are connected through a substantially ring-shaped intermediate pipe. O-rings are attached to annular grooves in the outer circumferential portions of the intermediate pipe. One of the O-rings tightly contacts the inner circumferential surface of the pipe connector of the oxygen-containing gas inlet manifold, and the other of the O-rings tightly contacts the inner circumferential surface of the pipe connector of the humidified air supply pipe.

4 Claims, 8 Drawing Sheets

FOREIGN PATENT DOCUMENTS

| | | |
|---|---|---|
| JP | 2001-216983 | 8/2001 |
| JP | 2004-158449 | 6/2004 |
| JP | 2005-158272 | 6/2005 |
| JP | 2005-231549 | 9/2005 |
| JP | 2006-32037 | 2/2006 |
| JP | 2006-40752 | 2/2006 |
| JP | 2006-302574 | 11/2006 |
| WO | WO 2006029601 A1 * | 3/2006 |

OTHER PUBLICATIONS

European Office Action for Application No. 08004309.4, dated May 23, 2008.
Chinese Office Action for Application No. 200810083593.7, dated Jul. 10, 2009.
Japanese Office Action for Application No. 2007-065179, 4 pages, dated May 15, 2012.

* cited by examiner

FUEL CELL SYSTEM

BACKGROUND OF THE INVENTION

1. Field of the Invention

The present invention relates to a fuel cell system including a fuel cell stack formed by stacking a plurality of power generation cells, and a humidifier for humidifying at least one of reactant gases supplied to the fuel cell stack using humidified fluid.

2. Description of the Related Art

For example, a polymer electrolyte fuel cell employs an electrolyte membrane (electrolyte) comprising a polymer ion exchange membrane. The electrolyte membrane is interposed between an anode and a cathode to form a membrane electrode assembly (electrolyte electrode assembly). The membrane electrode assembly is sandwiched between separators to form a power generation cell. In use, normally, a predetermined number of power generation cells are stacked together to form a fuel cell stack.

In the fuel cell, in order to achieve the desired ion conductivity, it is necessary to maintain the desired humidified state of the electrolyte membrane. For this purpose, in general, the oxygen-containing gas and the fuel gas are humidified through a humidifier before these gases are supplied to the fuel cell.

For example, a fuel cell humidification system disclosed in Japanese Laid-Open patent publication No. 2001-216983 includes a stack 1 and a humidification unit 2 as shown in FIG. 8. A connection surface 1a of the stack 1 and a connection surface 2a of the humidification unit 2 are overlapped with each other to connect the stack 1 and the humidification unit 2 together into one piece.

A fuel gas inlet port 3a and a fuel gas outlet port 3b are formed at positions along one diagonal line on the connection surface 1a of the stack 1, and a supply gas inlet port 4a and a supply gas outlet port 4b are provided at positions along the other diagonal line on the connection surface 1a. Further, a coolant water inlet port 5a and a coolant water outlet port 5b are formed at substantially central positions on the left and right sides.

On the connection surface 2a of the humidification unit 2, in correspondence with the ports of the stack 1, a fuel gas discharge port 3c, a fuel gas intake port 3d, a supply gas discharge port 4c, an off gas intake port 4d, a coolant water discharge port 5c, and a coolant water intake port 5d are formed.

As described above, the humidification unit 2 and the stack 1 are combined together into one piece. Therefore, it is possible to easily simplify the structure and reduce the overall size and weight of the apparatus.

However, in the fuel cell humidification system, at the time of overlapping and connecting the connection surface 1a of the stack 1 and the connection surface 2a of the humidification unit 2, the pipes of the stack 1 and the pipes of the humidification unit 2 need to be accurately positioned in alignment with each other.

For example, by accurately positioning the fuel gas inlet port 3a of the stack 1 and the fuel gas discharge port 3c of the humidification unit 2 coaxially, the smooth flow of the fuel gas is achieved.

SUMMARY OF THE INVENTION

The present invention has been made in consideration of the needs mentioned above, and an object of the present invention is to provide a fuel cell system which makes it possible to suitably and highly accurately connect fluid pipes of a fuel cell stack and fluid pipes of a humidifier with simple structure.

The present invention relates to a fuel cell system including a fuel cell stack formed by stacking a plurality of power generation cells, and a humidifier for humidifying at least one of reactant gases supplied to the fuel cell stack using humidified fluid. In the fuel cell system, a fluid pipe provided for the fuel cell stack and a fluid pipe provided for the humidifier are connected by a separate intermediate pipe.

In the present invention, since the fluid pipe of the fuel cell stack and the fluid pipe of the humidifier are connected by the intermediate pipe, even if there is an axial misalignment between the fluid pipes, by tilting of the intermediate pipe, the axial misalignment can be absorbed reliably. Thus, with the simple structure, it is possible to connect the fluid pipe of the fuel cell stack and the fluid pipe of the humidifier suitably and highly accurately, and the smooth flow of the reactant gases is achieved reliably.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
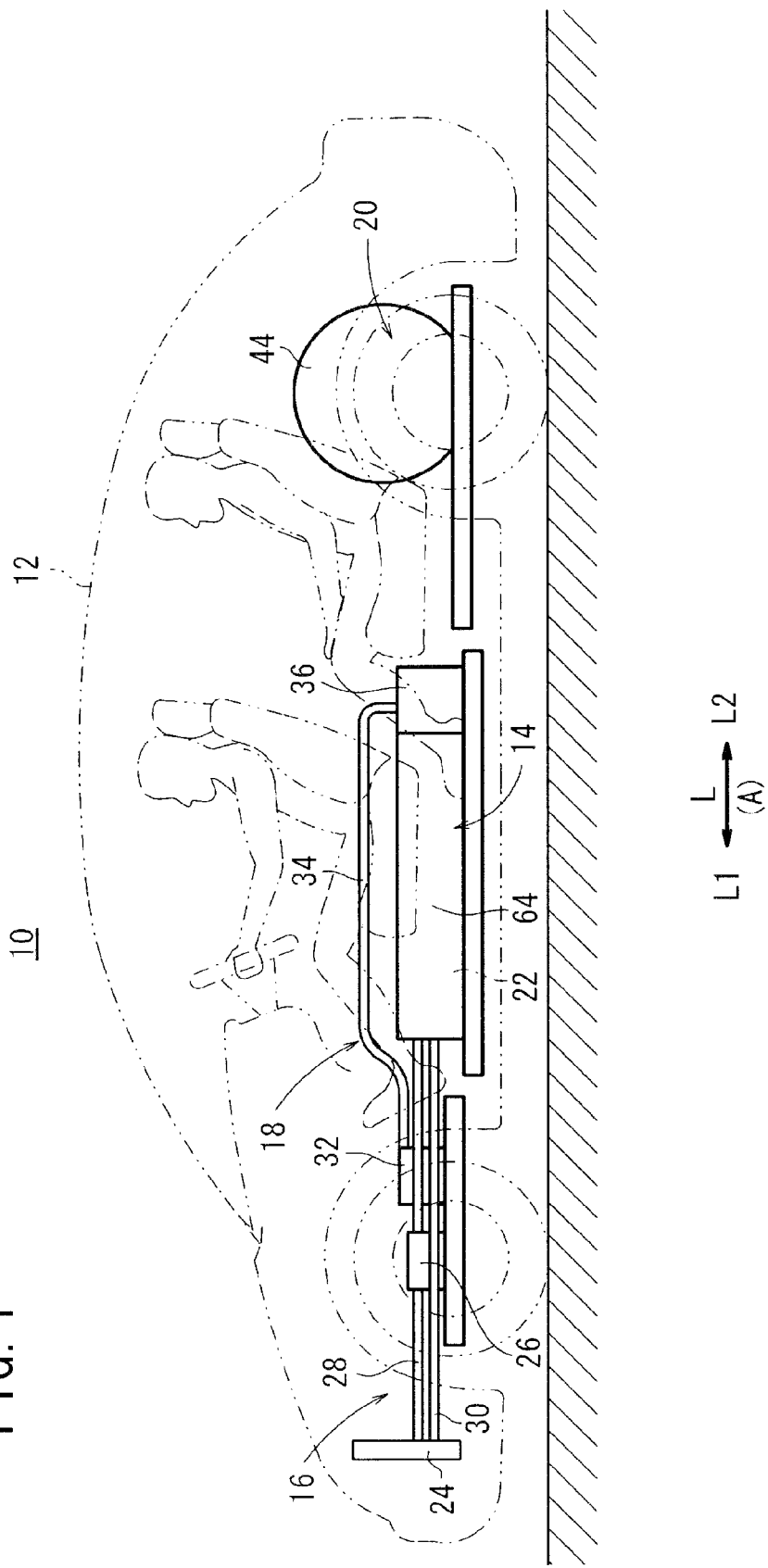
FIG. 1 is a side view schematically showing a fuel cell vehicle equipped with an in-vehicle fuel cell system according to an embodiment of the present invention.
Figure 2:
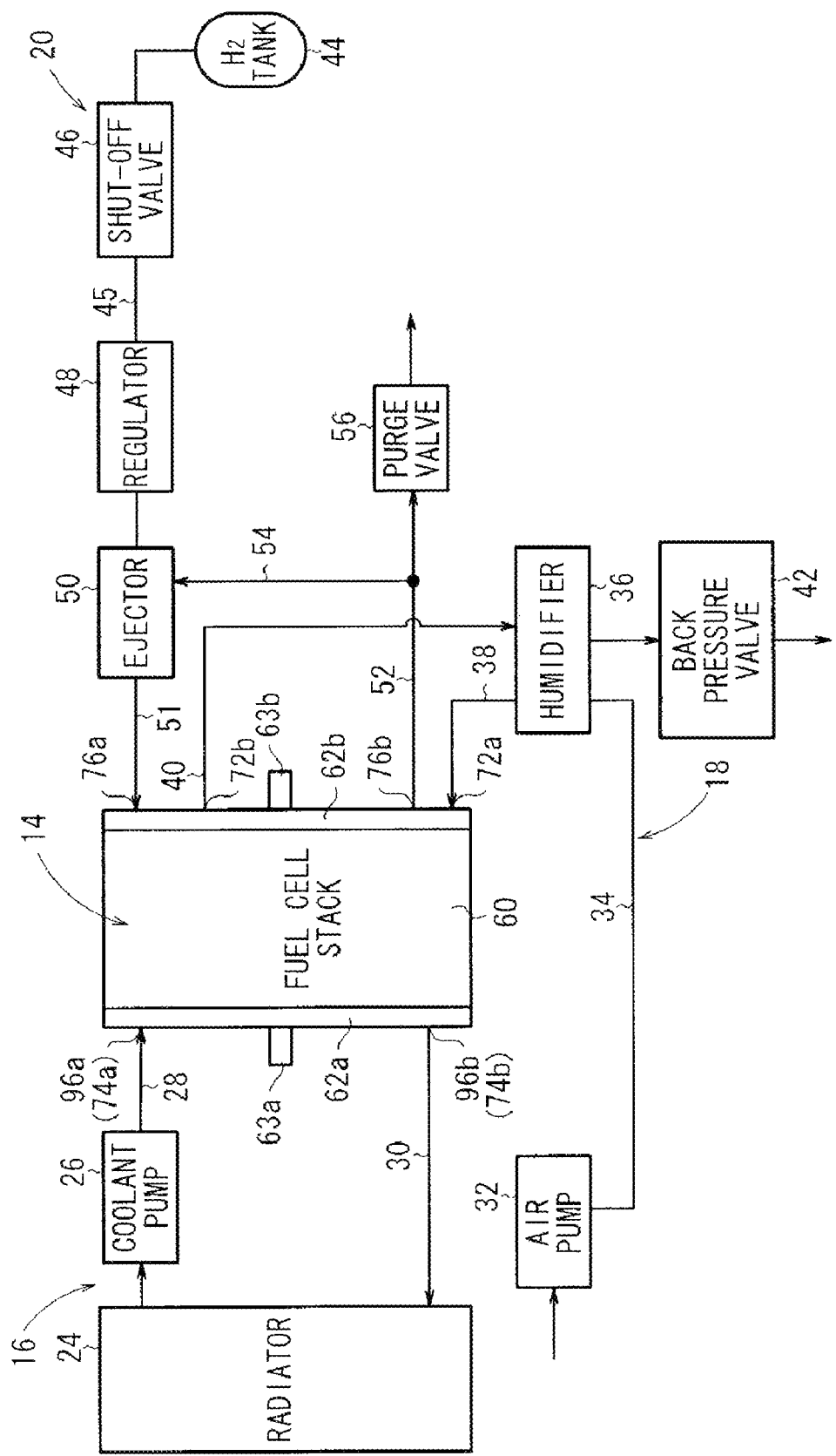
FIG. 2 is a diagram schematically showing structure of the fuel cell system.

FIG. 1 is side view schematically showing a fuel cell vehicle 12 equipped with a fuel cell system 10 according to an embodiment of the present invention. FIG. 2 is a diagram schematically showing structure of the fuel cell system 10. For the purpose of explanation, the positions of after-mentioned constituent elements shown in FIG. 2 are different from actual positions of the constituent elements. The actual positions of the constituent elements are shown in FIG. 1.

The fuel cell system 10 includes a fuel cell stack 14, a coolant supply mechanism 16 for supplying a coolant to the fuel cell stack 14, an oxygen-containing gas supply mechanism 18 for supplying an oxygen-containing gas (reactant gas) to the fuel cell stack 14, and a fuel gas supply mechanism 20 for supplying a fuel gas (reactant gas) to the fuel cell stack 14.

The fuel cell stack 14 is provided at the center in a lateral direction of the fuel cell vehicle 12, and components of the fuel cell stack 14 are stacked in a longitudinal direction (hereinafter also referred to as the stacking direction) of the fuel cell vehicle 12 indicated by an arrow L. For example, the fuel cell stack 14 is provided in a center console 22.

As shown in FIGS. 1 and 2, the coolant supply mechanism 16 includes a radiator 24 provided on the front side in a traveling direction (indicated by an arrow L1 in FIG. 1) of the fuel cell vehicle 12. The radiator 24 is connected to a coolant supply pipe 28 through a coolant pump 26, and connected to a coolant discharge pipe 30. The coolant supply pipe 28 and the coolant discharge pipe 30 are provided on the front side in the traveling direction of the fuel cell vehicle 12 from the fuel cell stack 14.

The oxygen-containing gas supply mechanism 18 has an air pump 32 provided near the coolant pump 26. One end of an air supply pipe 34 is connected to the air pump 32, and the other end of the air supply pipe 34 is connected to a humidifier 36. The humidifier 36 is connected to the fuel cell stack 14 through a humidified air supply pipe 38. An off gas supply pipe 40 for supplying the consumed oxygen-containing gas (hereinafter referred to as the off gas) as humidified fluid is connected to the fuel cell stack 14 and the humidifier 36. The humidifier 36 has a back pressure valve 42 on a side where the off gas supplied through the off gas supply pipe 40 is discharged (see FIG. 2).

The fuel gas supply mechanism 20 includes a fuel gas tank (fuel tank) 44 where a hydrogen gas is stored as a fuel gas. One end of a fuel gas pipe 45 is connected to the fuel gas tank 44, and a fuel gas supply pipe 51 is connected to the fuel gas pipe 45 through a shut-off valve 46, a regulator 48, and an ejector 50. Further, the fuel gas supply pipe 51 is connected to the fuel cell stack 14.

An exhaust fuel gas pipe 52 for discharging the consumed fuel gas is connected to the fuel cell stack 14. The exhaust fuel gas pipe 52 is connected to the ejector 50 through a return pipe 54, and also connected to a purge valve 56.

The fuel cell stack 14 is formed by stacking a plurality of power generation cells 60 horizontally in the longitudinal direction indicated by an arrow A. Metal end plates 62a, 62b are provided through terminal plates and insulating plates (not shown) at both ends of the fuel cell stack 14 in the stacking direction. Power output terminals 63a, 63b protrude outwardly from the end plates 62a, 62b in the stacking direction. The power output terminals 63a, 63b are connected to a travel motor and auxiliary devices (not shown).

The fuel cell stack 14 has a casing 64 including end plates 62a, 62b. The end plates 62a, 62b are formed in a rectangular shape having long sides in a vertical direction indicated by an arrow C.

Figure 3:
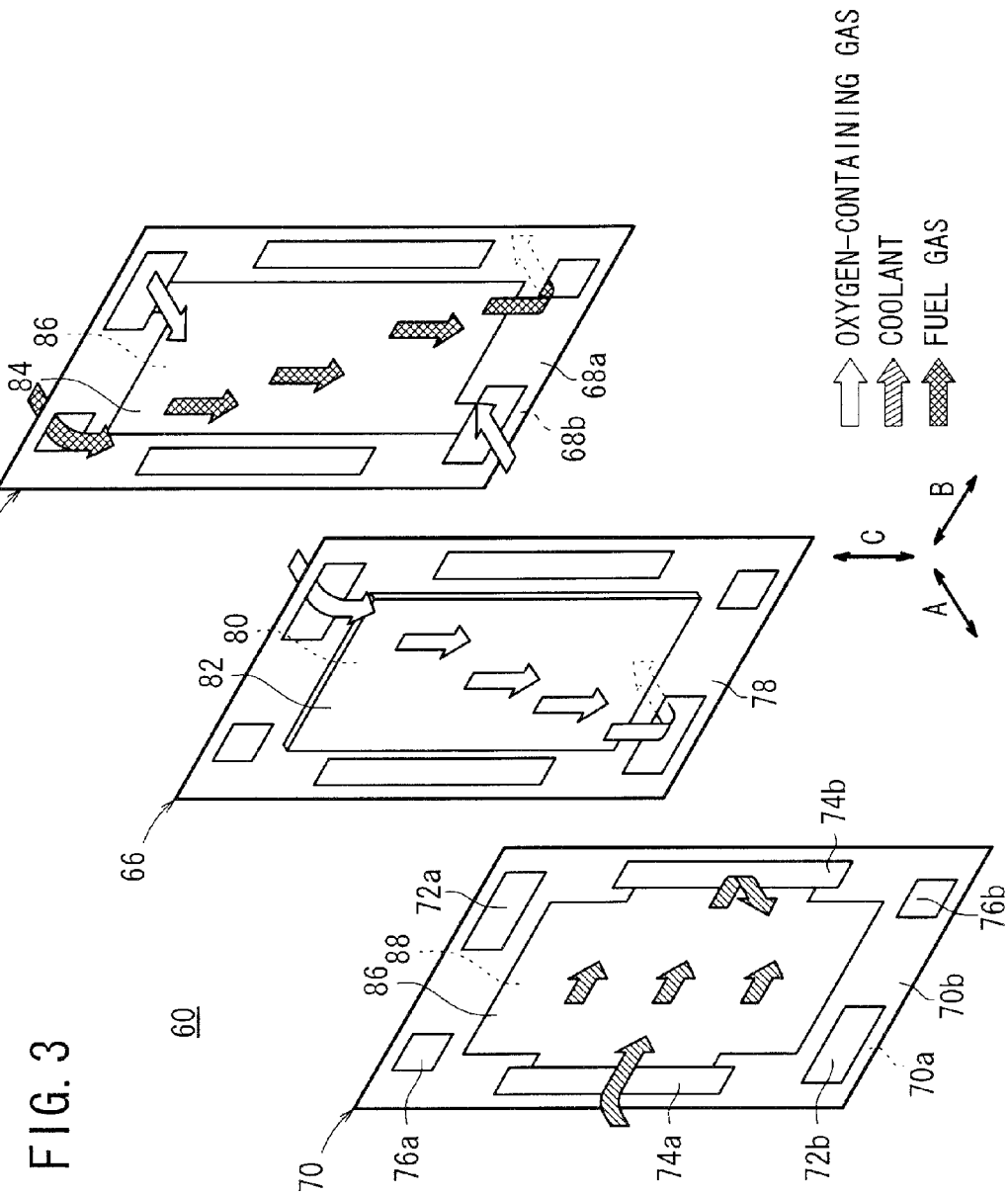
FIG. 3 is an exploded perspective view showing a power generation cell of the fuel cell stack.

As shown in FIG. 3, each of the power generation cells 60 includes a membrane electrode assembly (electrolyte electrode assembly) 66 and thin corrugated first and second metal separators 68, 70 sandwiching the membrane electrode assembly 66. Each of the power generation cells 60 is elongated in the longitudinal direction. Instead of the first and second metal separators 68, 70, for example, carbon separators may be used.

At one end of the power generation cell 60 in the longitudinal direction indicated by the arrow C, an oxygen-containing gas supply passage 72a for supplying an oxygen-containing gas and a fuel gas supply passage 76a for supplying a fuel gas such as a hydrogen-containing gas are provided. The oxygen-containing gas supply passage 72a and the fuel gas supply passage 76a extend through the power generation cell 60 in the direction indicated by the arrow A.

At the other end of the power generation cell 60 in the longitudinal direction, an oxygen-containing gas discharge passage 72b for discharging the oxygen-containing gas and a fuel gas discharge passage 76b for discharging the fuel gas are provided. The oxygen-containing discharge passage 72b and the fuel gas discharge passage 76b extend through the power generation cell 60 in the direction indicated by the arrow A.

At one end of the power generation cell 60 in the lateral direction indicated by the arrow B, a coolant supply passage 74a for supplying a coolant and a coolant discharge passage 74b for discharging the coolant are provided. The coolant supply passage 74a and the coolant discharge passage 74b are elongated in the longitudinal direction.

The membrane electrode assembly 66 includes an anode 80, a cathode 82, and a solid polymer electrolyte membrane 78 interposed between the anode 80 and the cathode 82. The solid polymer electrolyte membrane 78 is formed by impregnating a thin membrane of perfluorosulfonic acid with water, for example.

The first metal separator 68 has a fuel gas flow field 84 on its surface 68a facing the membrane electrode assembly 66. The fuel gas flow field 84 is connected to the fuel gas supply passage 76a and the fuel gas discharge passage 76b. For example, the fuel gas flow field 84 comprises a plurality of grooves extending in the direction indicated by the arrow C. Further, a coolant flow field 86 is formed on a surface 68b of the first metal separator 68. The coolant flow field 86 is connected to the coolant supply passage 74a and the coolant discharge passage 74b. The coolant flow field 86 comprises grooves extending in the direction indicated by the arrow B.

The second metal separator 70 has an oxygen-containing gas flow field 88 on its surface 70a facing the membrane electrode assembly 66. The oxygen-containing gas flow field 88 comprises grooves extending in the direction indicated by the arrow C. The oxygen-containing gas flow field 88 is connected to the oxygen-containing gas supply passage 72a and the oxygen-containing gas discharge passage 72b. A surface 70b of the second metal separator 70 is overlapped with the surface 68b of the first metal separator 68 to form a coolant flow field 86. Though not shown, seal members are provided on the first and second metal separators 68, 70 as necessary.

Figure 4:
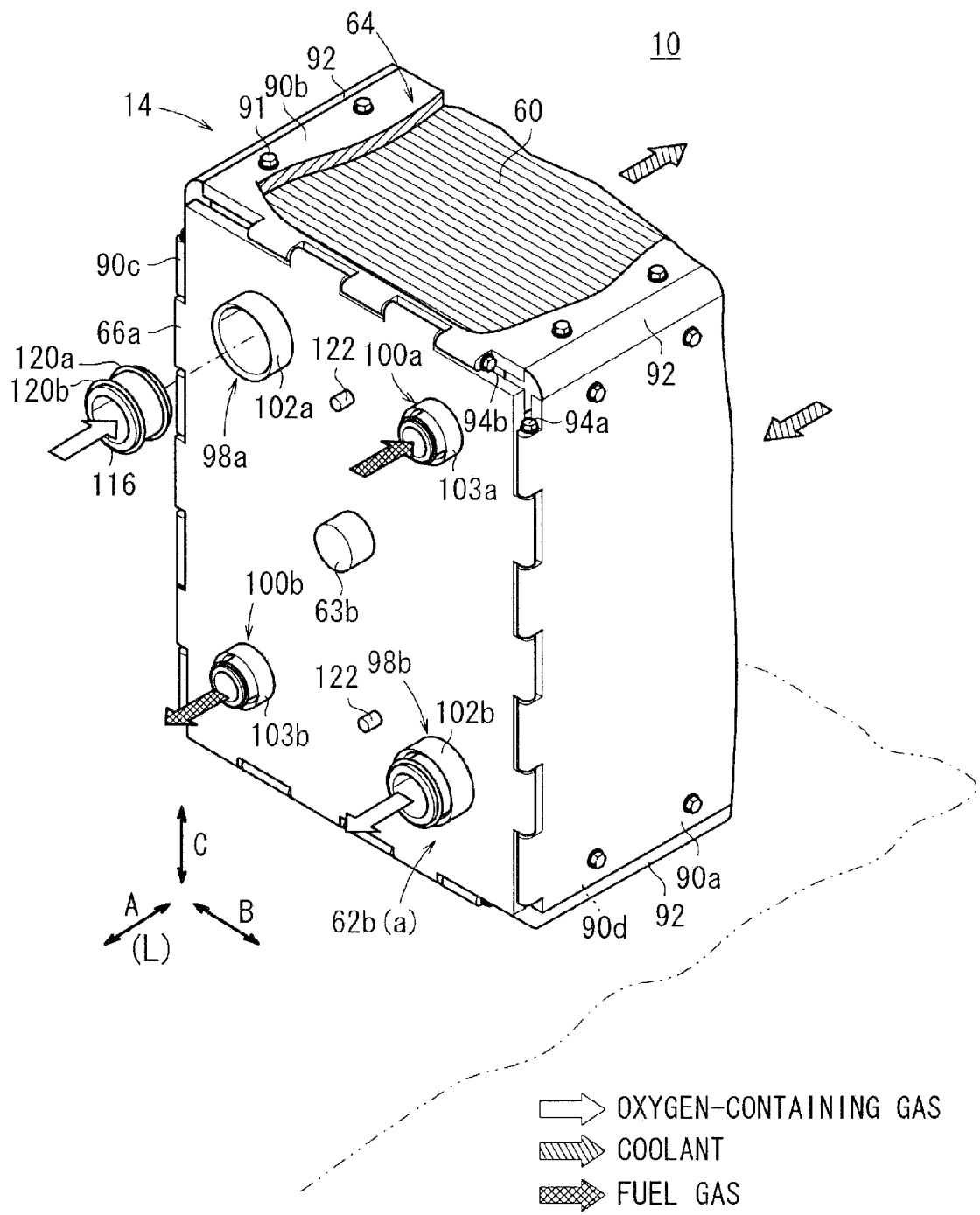
FIG. 4 is a perspective view showing the fuel cell stack, as viewed from a humidifier.

As shown in FIG. 4, the casing 64 includes end plates 62a, 62b, four panel members 90a to 90d provided on sides of the stacked power generation cells 60, angle members 92 for coupling the adjacent ends of the panel members 90a to 90d together by bolts 91, coupling pins 94a, 94b having different lengths for coupling the end plates 62a, 62b and the panel members 90a to 90d. The panel members 90a to 90d are thin metal plates.

As shown in FIG. 2, a coolant inlet manifold 96a and a coolant outlet manifold 96b are provided at the end plate 62a. The coolant inlet manifold 96a is connected to the coolant supply passage 74a, and the coolant outlet manifold 96b is connected to the coolant discharge passage 74b. Further, the coolant inlet manifold 96a and the coolant outlet manifold 96b are connected to the radiator 24 through the coolant supply pipe 28 and the coolant discharge pipe 30.

As shown in FIG. 4, an oxygen-containing gas inlet manifold 98a, a fuel gas inlet manifold 100a, an oxygen-containing gas outlet manifold 98b, and a fuel gas outlet manifold 100b are provided at the end plate 62b. The oxygen-containing gas inlet manifold 98a is connected to the oxygen-containing supply passage 72a. The fuel gas inlet manifold 100a is connected to the fuel gas supply passage 76a. The oxygen-containing gas outlet manifold 98b is connected to the oxygen-containing gas discharge passage 72b. The fuel gas outlet manifold 100b is connected to the fuel gas discharge passage 76b.

The oxygen-containing gas inlet manifold 98a, the fuel gas inlet manifold 100a, the oxygen-containing gas outlet manifold 98b, and the fuel gas outlet manifold 100b have pipe connectors 102a, 103a, 102b and 103b each having a thin cylindrical shape. The pipe connectors 102a, 103a, 102b and 103b protrude outwardly from the surface of the end plate 62b in the stacking direction.

Figure 5:
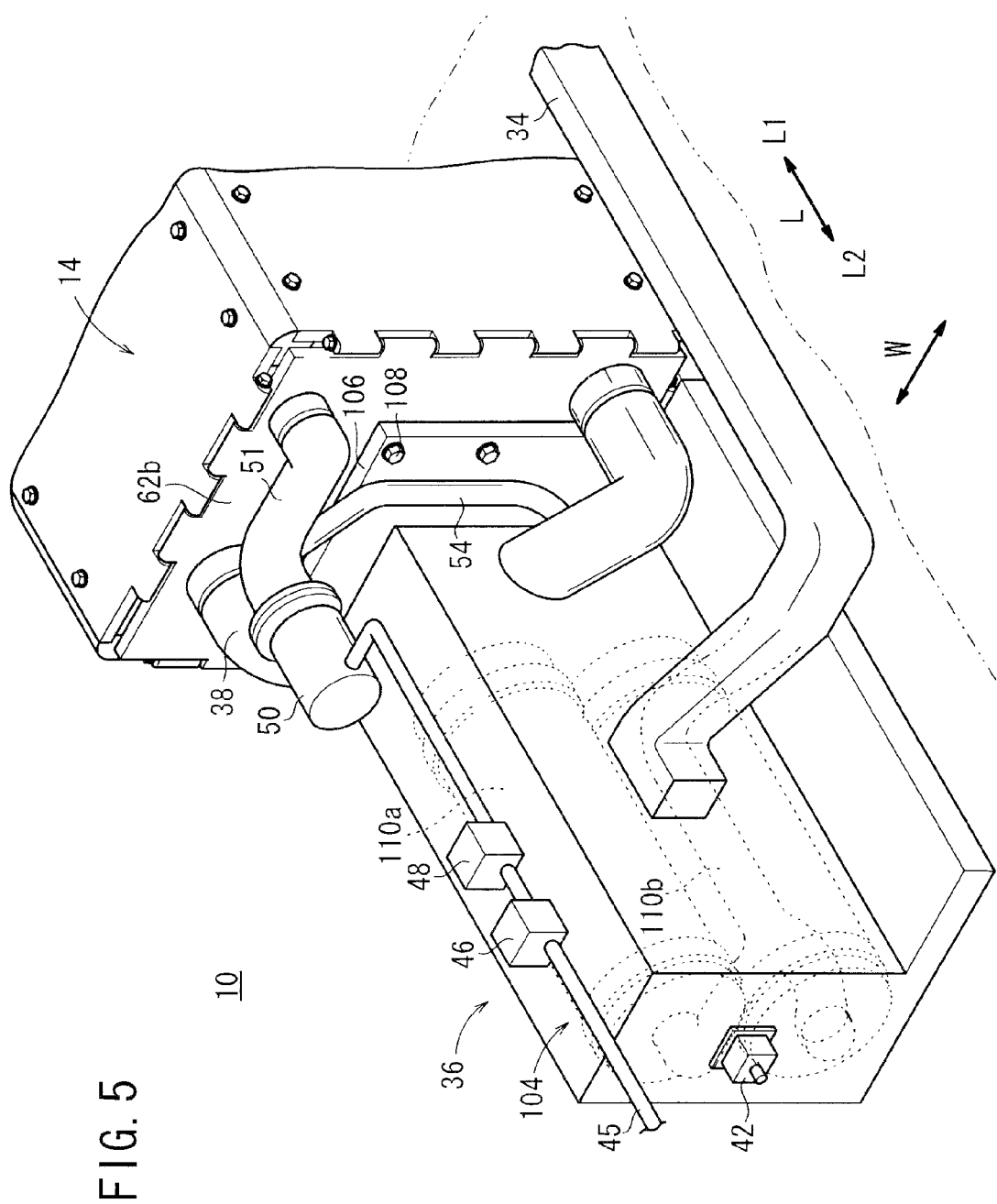
FIG. 5 is a perspective view showing the humidifier and the fuel cell stack.

As shown in FIG. 5, the metal casing 104 of the humidifier 36 is fixed to the end plate 62b of the fuel cell stack 14. For example, the casing 104 is formed by molding. A plurality of bolts 108 are inserted into a flange 106 which contacts the end plate 62b. The bolts 108 are threaded into the end plate 62b to fix the casing 104 to the end plate 62b.

In the casing 104, first and second humidifier sections 110a, 110b are arranged vertically. The first humidifier section 110a and the second humidifier section 110b are connected to the air supply pipe 34 and the humidified air supply pipe 38. For example, the first humidifier section 110a and the second humidifier section 110b adopt hollow fiber humidifier structure. Auxiliary devices of the fuel gas supply mechanism 20 such as the shut-off valve 46, the regulator 48, the ejector 50, and the back pressure valve 42 are provided integrally with the casing 104.

Figure 6:
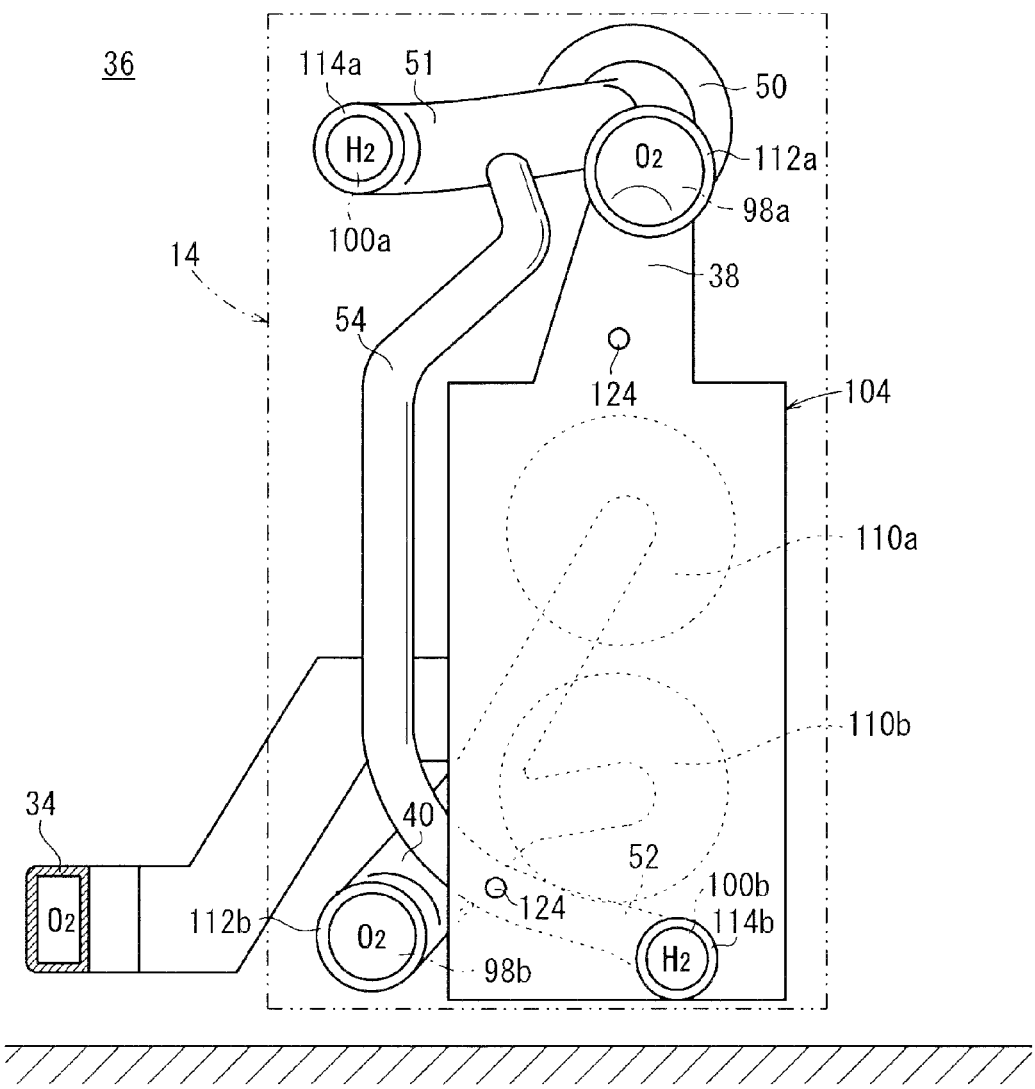
FIG. 6 is a front view of the humidifier, showing a side where the humidifier is attached to the fuel cell stack.

As shown in FIG. 6, pipe connectors 112a, 112b, 114a, and 114b each having a thin cylindrical shape are provided at ends of the humidified air supply pipe 38, the off gas supply pipe 40, the fuel gas supply pipe 51, and the exhaust fuel gas pipe 52. The pipe connectors 112a, 112b, 114a, and 114b are connected to the pipe connectors 102a, 102b, 103a, and 103b of the oxygen-containing gas inlet manifold 98a, the oxygen-containing gas outlet manifold 98b, the fuel gas inlet manifold 100a, and the fuel gas outlet manifold 100b through intermediate pipes 116, respectively.

Figure 7:
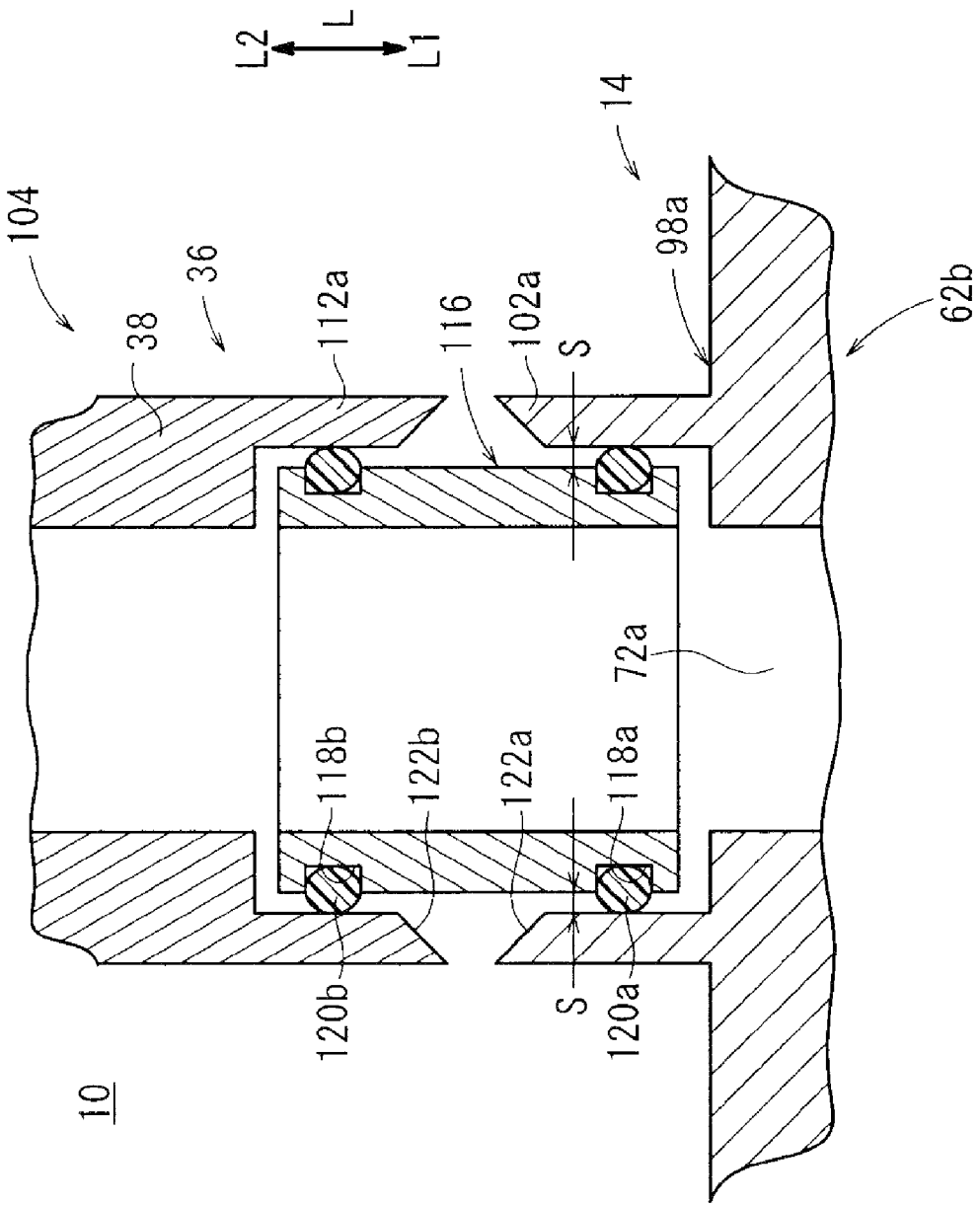
FIG. 7 is a view showing structure for connecting the humidifier and the fuel cell stack.
Figure 8:
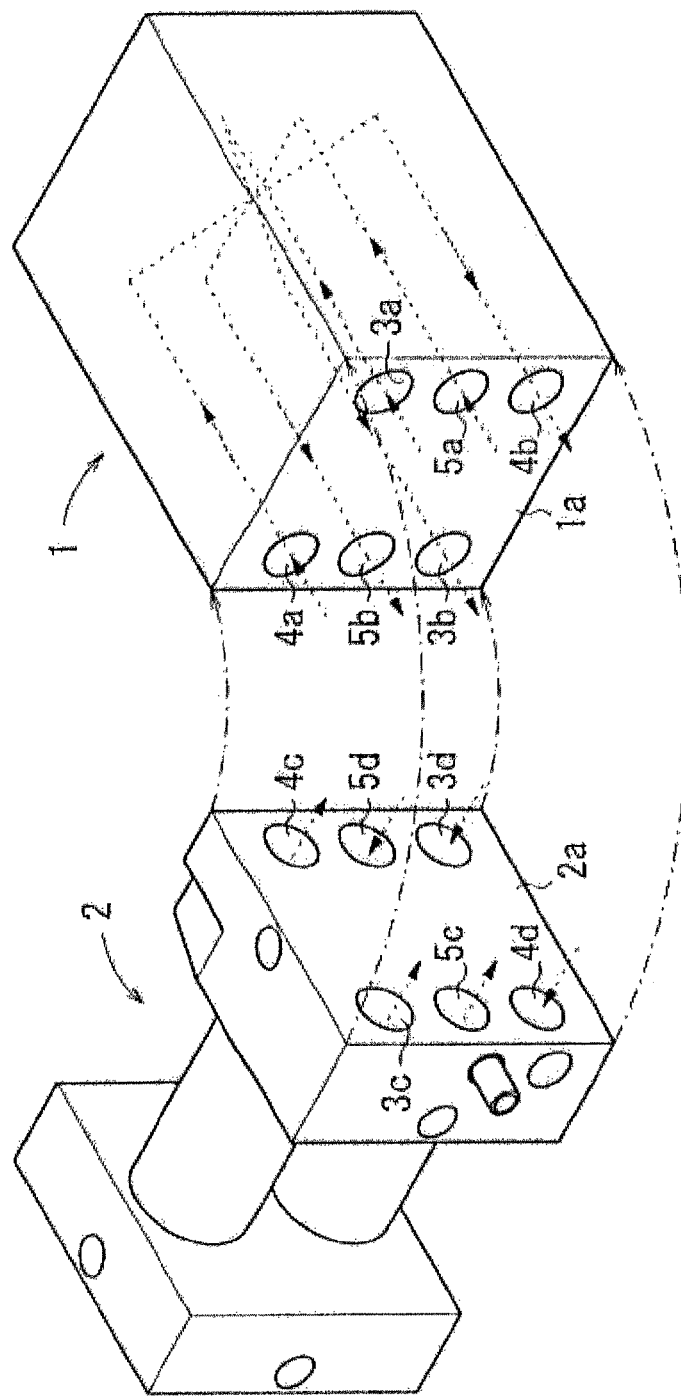
FIG. 8 is an exploded view showing a fuel cell humidification system disclosed in Japanese Laid-Open Patent publication No. 2001-216983.

As shown in FIG. 7, the intermediate pipe 116 has a substantially cylindrical shape. O-rings 120a, 120b are attached to annular grooves 118a, 118b at opposite ends in the outer circumferential portions of the intermediate pipe 116. The inner diameter of the pipe connector 102a of the oxygen-containing gas inlet manifold 98a and the inner diameter of the pipe connector 112a of the humidified air supply pipe 38 are substantially the same. A predetermined space S is formed between the inner surface of the pipe connectors 102a and the outer surface of the intermediate pipe 116 for absorbing the axial misalignment between the pipe connectors 102a, 112a by tilting of the intermediate pipe 116. The inner surfaces of the pipe connectors 102a, 112a include tapered portions 122a, 122b at front ends.

In the intermediate pipe 116, the O-ring 120a slidingly contacts the inner surface of the pipe connector 102a, and the other O-ring 120b slidingly contacts the inner surface of the pipe connector 112a to connect the oxygen-containing gas inlet manifold 98a and the humidified air supply pipe 38. The inner diameter of the intermediate pipe 116 is the same as the inner diameter of the oxygen-containing gas inlet manifold 98a, i.e., the inner diameters of the oxygen-containing gas supply passage 72a and the humidified air supply pipe 38.

The relationship between the oxygen-containing gas outlet manifold 98b and the off gas supply pipe 40, the relationship between the fuel gas inlet manifold 100a and the fuel gas supply pipe 51, and the relationship between the fuel gas outlet manifold 100b and the exhaust fuel gas pipe 52 are the same as the relationship between the oxygen-containing gas inlet manifold 98a and the humidified air supply pipe 38, and detailed description thereof will be omitted.

As shown in FIG. 4, a predetermined number of positioning knock pins 122 are provided in the end plate 62b. As shown in FIG. 6, a predetermined number of knock holes 124 are provided on the surface of the casing 104 joined to the end plate 62b for fitting the knock pins 122 into the knock holes 124.

In the embodiment, as shown in FIG. 2, a branch pipe with a purge valve (not shown) may be provided between the air supply pipe 34 of the oxygen-containing gas supply mechanism 18 and a position downstream of the ejector 50 of the fuel gas supply mechanism 20 for purging the fuel gas remaining in the fuel gas flow field system of the fuel cell stack 14.

Next, operation of the fuel cell system 10 will be described below.

Firstly, as shown in FIG. 2, the air pump 32 of the oxygen-containing gas supply mechanism 18 is operated to suck the external air as the oxygen-containing gas, and the air is supplied into the air supply pipe 34. The air flows from the air supply pipe 34 into the humidifier 36, and is supplied to the humidified air supply pipe 38 through the first and second humidifier sections 110a, 110b.

At this time, as descried later, the oxygen-containing gas consumed in reaction (off gas) is supplied to the off gas supply pipe 40. Thus, water in the off gas moves to the air before consumption, and humidifies the air. The humidified air flows from the humidified air supply pipe 38 to the oxygen-containing gas supply passage 72a in the fuel cell stack 14 through the end plate 62b.

In the fuel gas supply mechanism 20, the shut-off valve 46 is opened, and the pressure of the fuel gas (hydrogen-gas) in the fuel gas tank 44 is decreased by the regulator 48. Thereafter, the fuel gas flows through the ejector 50, and flows from the fuel gas supply pipe 51 to the end plate 62b. Thus, the fuel gas is supplied to the fuel gas supply passage 76a in the fuel cell stack 14.

Further, in the coolant supply mechanism 16, by operation of the coolant pump 26, the coolant flows from the coolant supply pipe 28 to the end plate 62a. Thus, the coolant is supplied into the coolant supply passage 74a in the fuel cell stack 14.

As shown in FIG. 3, after the air is supplied to each of the power generation cells 60 in the fuel cell stack 14, the air flows from the oxygen-containing gas supply passage 72a to the oxygen-containing gas flow field 88 of the second metal separator 70, and flows along the cathode 82 of the membrane electrode assembly 66 for inducing an electrochemical reaction at the cathode 82. The fuel gas flows from the fuel gas supply passage 76a to the fuel gas flow field 84 of the first metal separator 68, and flows along the anode 80 of the membrane electrode assembly 66 for inducing an electrochemical reaction at the anode 80.

Thus, in each of the membrane electrode assemblies 66, the oxygen in the air supplied to the cathode 82, and the fuel gas (hydrogen) supplied to the anode 80 are consumed in the electrochemical reactions at catalyst layers of the cathode 82 and the anode 80 for generating electricity.

The air consumed at the cathode 82 flows along the oxygen-containing gas discharge passage 72b, and is discharged as the off gas from the end plate 62b to the off gas supply pipe 40 (see FIG. 2).

Likewise, the fuel gas consumed at the anode 80 flows along the fuel gas discharge passage 76b, and is discharged as the exhaust fuel gas from the end plate 62b to the exhaust fuel gas pipe 52. The exhaust fuel gas discharged to the exhaust fuel gas pipe 52 partially flows through the return pipe 54, and returns to the fuel gas supply pipe 51 by sucking operation of the ejector 50. The exhaust fuel gas is mixed with the fresh fuel gas, and then, supplied from the fuel gas supply pipe 51 to the fuel cell stack 14. The remaining exhaust fuel gas is discharged when the purge valve 56 is opened.

Further, as shown in FIG. 3, the coolant flows from the coolant supply passage 74a to the coolant flow field 86 between the first and second metal separators 68, 70, and flows in the direction indicated by the arrow B. After the coolant cools the membrane electrode assembly 66, the coolant flows through the coolant discharge passage 74b, and the coolant is discharged from the coolant outlet manifold 96b at the end plate 62a to the coolant discharge pipe 30. As shown in FIG. 2, after the coolant is cooled by the radiator 24, by operation of the coolant pump 26, the coolant is supplied from the coolant supply pipe 28 to the fuel cell stack 14.

In the embodiment, the humidifier 36 is attached to the end plate 62b of the fuel cell stack 14. The fluid pipes of the fuel cell stack 14 and the fluid pipes of the humidifier 36 are connected by the intermediate pipes 116.

Specifically, the intermediate pipes 116 are provided between the pipe connectors 102a, 102b, 103a, and 103b of the oxygen-containing gas inlet manifold 98a, the oxygen-containing gas outlet manifold 98b, the fuel gas inlet manifold 100a, and the fuel gas outlet manifold 100b at the end plate 62b as shown in FIG. 4 and the pipe connectors 112a, 112b, 114a, and 114b of the humidified air supply pipe 38, the off gas supply pipe 40, the fuel gas supply pipe 51, and the exhaust fuel gas pipe 52 of the humidifier 36 as shown in FIG. 6.

As shown in FIG. 7, the predetermined space S is formed between the outer circumference of the intermediate pipe 116 and the inner circumference of the pipe connectors 102a, 112a, and the O-rings 120a, 120b are fitted to the outer circumference of the intermediate pipe 116 through the annular grooves 118a, 118b. The O-rings 120a, 120b tightly contact the inner circumferential surface of the pipe connector 102a of the oxygen-containing gas inlet manifold 98a and the inner circumferential surface of the pipe connector 112a of the humidified air supply pipe 38.

In the structure, since the pipe connectors 102a, 112a are coupled through the intermediate pipe 116, even if there is an axial misalignment between the pipe connectors 102a, 112a, for example, by tilting of the intermediate pipe 116, the axial misalignment can be absorbed reliably.

Thus, in the embodiment, with the simple structure, it is possible to suitably connect the fluid pipes of the fuel cell stack 14 and the fluid pipes of the humidifier 36 with a high degree of accuracy. As a result, the oxygen-containing gas and the fuel gas flow smoothly and reliably.

Further, using the intermediate pipes 116, it is possible to reliably and easily position the fuel cell stack 14 and the humidifier 36 with respect to each other. At this time, by fitting the predetermined number of the knock pins 122 into the predetermined number of the knock holes 124, operation of positioning the fuel cell stack 14 and the humidifier 36 is further simplified.

Since the intermediate pipes 116 can be utilized as positioning members, for example, at least two intermediate pipes 116 may be used, and mating (spigot) structure may be adopted for the other fluid pipes that are not connected by the intermediate pipes 116.

Further, in the embodiment, the inner diameter of the intermediate pipe 116 is the same as the inner diameter of the humidified air supply pipe 38 and the inner diameter of the oxygen-containing gas inlet manifold 98a. Thus, the humidified air smoothly and suitably flows from the humidified air supply pipe 38 to the oxygen-containing gas inlet manifold 98a through the intermediate pipe 116.

While the invention has been particularly shown and described with reference to a preferred embodiment, it will be understood that variations and modifications can be effected thereto by those skilled in the art without departing from the spirit and scope of the invention as defined by the appended claims.

What is claimed is:

1. A fuel cell system comprising:
a fuel cell stack formed by stacking a plurality of power generation cells; and
a humidifier for humidifying at least one reactant gas supplied to said fuel cell stack using humidified fluid,
wherein an end plate of said fuel cell stack and a casing of the humidifier are joined to each other using a knock pin,
wherein an opening for a fluid pipe provided for said fuel cell stack is substantially aligned with an opening for a fluid pipe provided for said humidifier, the fluid pipe provided for the fuel cell stack and the fluid pipe provided for said humidifier not being in direct contact with each other, the openings of the fluid pipes connected by a separate intermediate pipe,
wherein ends of the respective fluid pipes for the humidifier and the fuel cell stack include pipe connectors between which the intermediate pipe is located, the pipe connector for the fluid pipe provided for the fuel cell stack protruding from the end plate of the fuel cell stack, and
wherein spaces are formed between an outer circumference formed by an exterior surface of said intermediate pipe and an inner circumference formed by an interior surface of the pipe connector of said fluid pipe for the fuel cell stack and between the outer circumference formed by the exterior surface of said intermediate pipe and an inner circumference formed by an interior surface of the pipe connector of said fluid pipe for the humidifier, O-rings being provided in said spaces that are the only point of contact between the intermediate pipe and the fluid pipes.

2. A fuel cell system according to claim 1, wherein said fuel cell system includes a plurality of fluid pipes including an oxygen-containing gas supply pipe and an oxygen-containing gas discharge pipe for a first reactant gas, and a fuel gas supply pipe and a fuel gas discharge pipe for a second reactant gas, and intermediate pipes are provided for at least two of the fluid pipes.

3. A fuel cell system according to claim 1, wherein an inner diameter of said intermediate pipe and an inner diameter of a fluid passage connected to said fluid pipe for the fuel cell stack or the humidifier are the same.

4. A fuel cell system according to claim 1, wherein said fuel cell stack is configured to be mounted in a vehicle.

* * * * *